United States Patent [19]

Pankratz

[11] Patent Number: 4,517,477
[45] Date of Patent: May 14, 1985

[54] MAGNETIC MOTOR

[76] Inventor: David P. Pankratz, 4611 E. Calle Redonda, Phoenix, Ariz. 85018

[21] Appl. No.: 107,030

[22] Filed: Dec. 26, 1979

Related U.S. Application Data

[63] Continuation-in-part of Ser. No. 927,018, Jul. 24, 1978, abandoned.

[51] Int. Cl.³ .............................................. H02K 7/06
[52] U.S. Cl. ...................................... 310/23; 310/24; 310/46
[58] Field of Search ....................... 310/24, 23, 34, 35

[56] References Cited

U.S. PATENT DOCUMENTS 3,636,391  1/1972  Horner et al. ...................... 310/24
3,688,136  8/1972  Salverda .............................. 310/24

Primary Examiner—Donovan F. Duggan
Attorney, Agent, or Firm—Don J. Flickinger

[57] ABSTRACT

A plurality of permanent magnets are arranged to have spaced apart alternating opposite poles at the peripheral of the rotor. A stator magnet alternately attracts the first pole and repels the second pole of each sequential permanent magnet to cause rotation of the rotor. During the interval in which the stator magnet is intermediate to the poles of a given rotor magnet, the force of the stator magnet is nullified.

11 Claims, 8 Drawing Figures

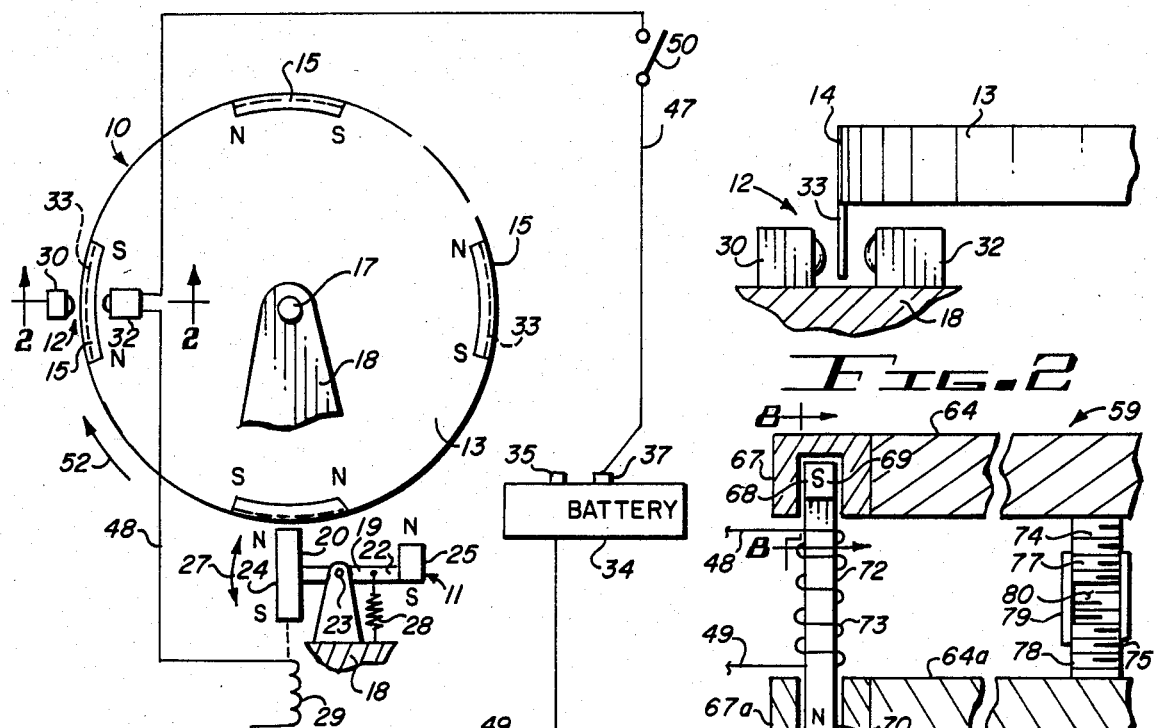
FIG.1
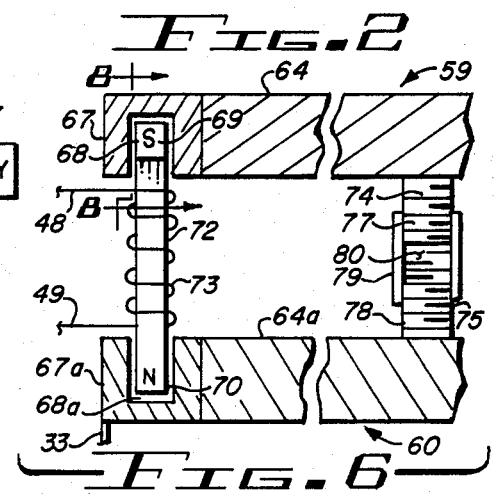
FIG.2
FIG.6
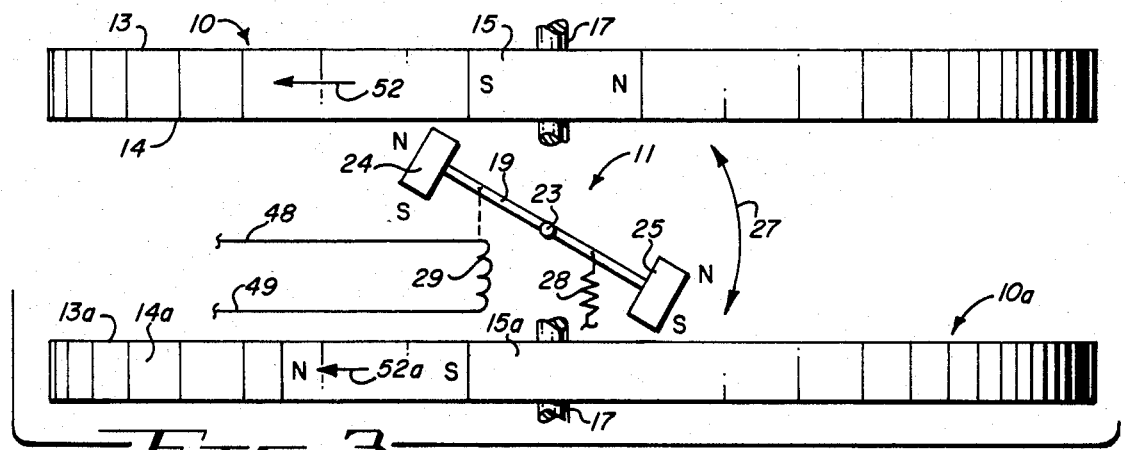
FIG.3
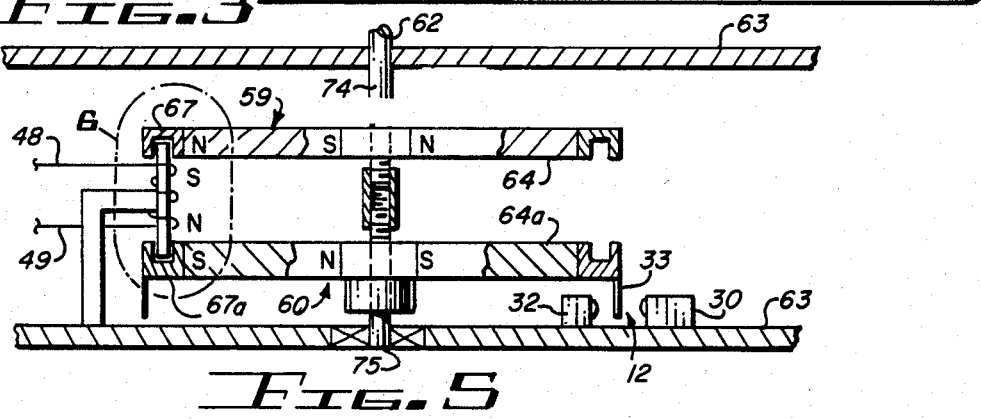
FIG.5

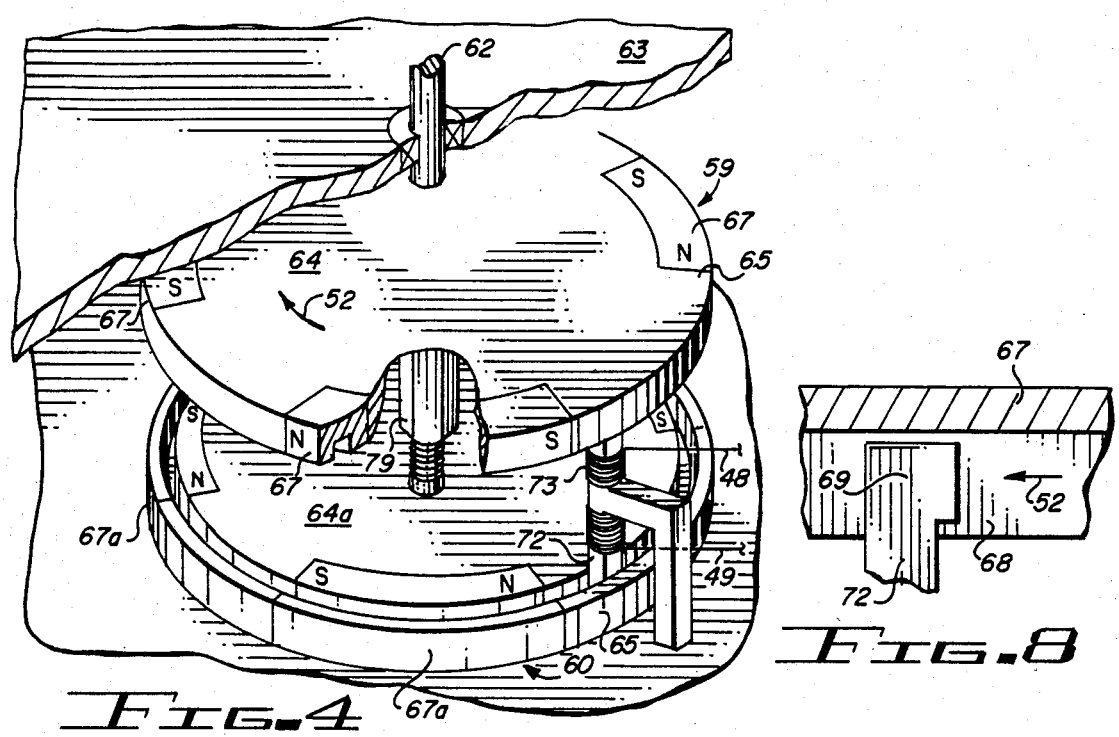
FIG. 4
FIG. 8
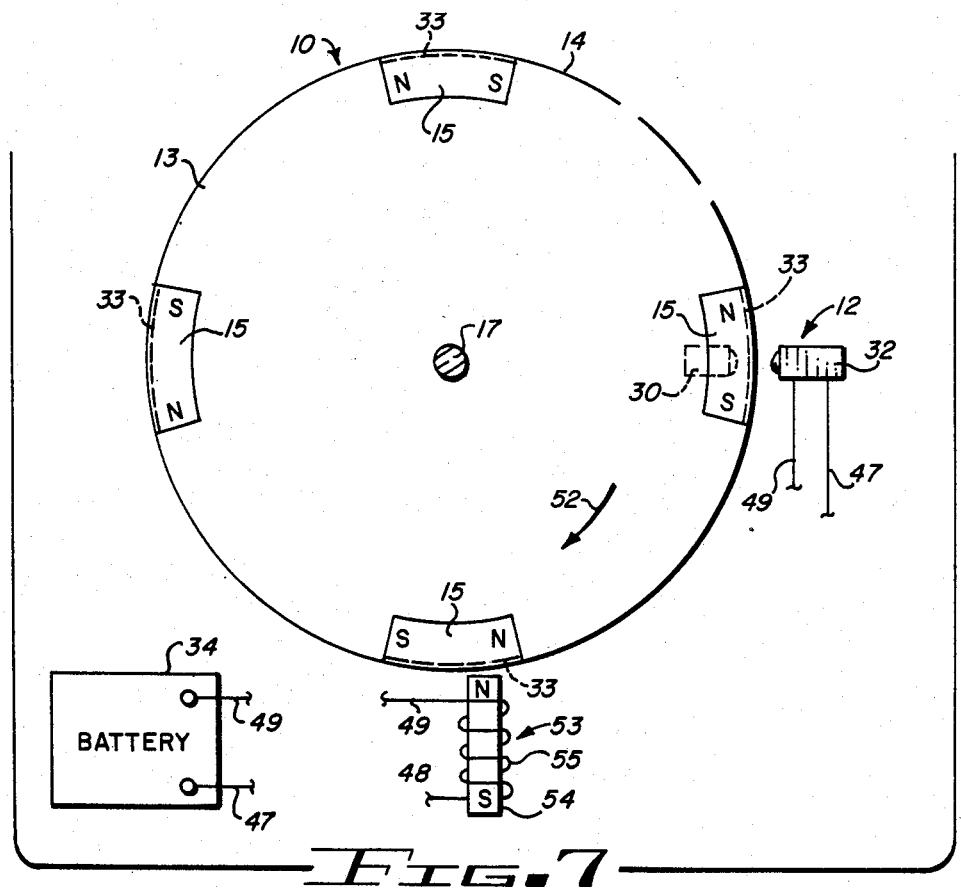
FIG. 7

MAGNETIC MOTOR

CROSS-REFERENCE TO RELATED APPLICATION

The instant application is a continuation-in-part application of the common inventor's prior filed co-pending application, Ser. No. 927,018, filed July 24, 1978, entitled MAGNETIC MOTOR now abandoned.

BACKGROUND OF THE INVENTION

1. Field of the Invention

This invention generally relates to the art of magnetism.

More particularly, the present invention relates to a magnetic motor.

In a further aspect, the instant invention concerns a magnetic motor which utilizes the energy stored in a permanent magnet to produce a rotational force.

2. Description of the Prior Art

It is well recognized by the prior art that the energy stored within a permanent magnet can be used to produce useful work. More specifically, it has been established that the energy within a permanent magnet, or a plurality of permanent magnets, can be harnessed to produce rotational force. Magnetic motors which serve to illustrate the general principle are disclosed in U.S. Pat. Nos. 3,688,136 and 3,895,245 issued to Robert E. Salverda and George Fred Bode, respectively.

The foregoing references were discovered during a search of United States Patent and Trademark Office records. Other references found during the search were:

| | | | |
|---|---|---|---|
| 3,391,289 | Danilewicz | 3,171,991 | Baumer |
| 2,063,773 | Warnick et al | 2,754,439 | Elwood |
| 3,513,326 | Potts | 3,240,947 | Mas |

Of the foregoing references, U.S. Pat. Nos. 3,688,136 and 3,895,245 are considered to be the most pertinent to the immediate invention.

U.S. Pat. No. 3,688,136 discloses a magnetic motor in which the rotor is in the form of a pair of perpendicular arms which are spaced axially upon a shaft. A permanent motor is carried at each end of each arm. The permanent magnets are of the bar-type, being parallel to the shaft, and have like poles oriented in the same direction.

A stator cooperates with each arm. Each stator includes a permanent magnet of the same size and configuration as the rotor magnets. The stator magnets, each of which is carried at the end of a lever arm, are parallel to the shaft and oriented in the same direction as the rotor magnets. A spring acts upon the arm to normally hold each stator magnet in a position remote from the circumferential path of the respective rotor magnet. At periodic intervals, a solenoid acts upon the arm to swing the stator magnet into position behind the rotor magnet, repelling the rotor magnet and urging rotation of the shaft.

A storage battery supplies electrical energy to each solenoid. Timing is accomplished by a pair of cams carried by the shaft. A normally open switch, one periodically activated by each cam, is wired in series between the battery and a respective solenoid.

Set forth in U.S. Pat. No. 3,895,254 is a magnetic motor having a pair of counter rotating rotors which are connected by gearing so as to turn at the same speed in opposite directions. Each rotor carries a plurality of radially disposed permanent magnets which are oriented to have like poles near the periphery of the rotor. Like poles of a magnet carried by one rotor and a corresponding magnet carried by the other rotor oppose each other at what may be termed the point of tangency of the rotors.

The magnets moving together at the approach to the point of tangency are separated by a magnetic shield, specifically fabricated of tin plated steel. A space exists between the apex of the shield and the point of tangency of the rotors. An electromagnet of opposite polarity is positioned opposite the apex of the shield to pull the rotor magnets past the dead center or aligned position.

In a modified embodiment, an electro-magnet of the same polarity as the rotor magnets, is positioned at the apex of the shield to repel the rotor magnets past the dead center position. In either case, the electro-magnet is energized by an external source of electric current. The flow of electrical current from the source thereof to the electro-magnet is timed by a make and break switch activated by a cam mounted upon one of the rotor shafts.

The prior art devices are based upon certain valid data and assumptions. Briefly, it is recognized by the prior art that permanent magnets can be employed within a rotor and within a cooperating stator to provide a magnetic motor. A substantial quantity of energy resides within a magnet and even though substantial loading is placed upon the magnet, the energy dissipates slowly over an extended period of time. Further, the prior art recognizes that the input of electrical energy into a magnetic motor is intermittent and for short intervals. Accordingly, it is possible to control substantial amounts of output power with relatively small amounts of input energy. Another important point is the fact that it can be scaled up, utilizing stronger magnets, since the input energy and the internal losses do not increase as rapidly as the output. For a further discussion concerning the basic principles of magnetic motors, attention is directed to the disclosures of U.S. Pat. Nos. 3,688,136 and 3,895,245.

The potential indicated by the foregoing data, however, has never been realized by the prior art. For example, the device set forth in U.S. Pat. No. 3,688,136 operates only upon repulsion. Energy can be extracted from a magnet both as repulsion and attraction. Therefore it is seen that only one-half of the energy available within the permanent magnets is being utilized. Further the energy is utilized during exceedingly short widely spaced impulses. The use of two solenoids to operate a single rotor is considered excessive input energy.

The device set forth in U.S. Pat. No. 3,895,245 operates totally upon the energy available at one pole of the rotor magnets and ignores the energy available at the other end thereof. The magnetic shield usurps a portion of the energy from the rotor magnets, which energy is not available to do useful work in the form of urging rotation of the rotors. Further, at a specific point in the area of the apex of the shield each magnet is concurrently influenced by the shield and the opposing magnet. At this point, which is prior to the point of tangency, an equilibrium is reached tending to bring the rotors to a stop. From that point to the point of tangency, the opposed magnets are in repulsion, the net result of which is a force in a direction counter to the normal direction or rotation. The primary purpose of the stator magnet is to pull the opposed rotor magnets from the point of equilibrium through the point of tangency. It is seen, therefore, that the motor operates entirely upon the repelling force of the permanent magnets and the energy of the stator magnet does not materially add to the power output of the motor.

In summary, it can be stated that none of the prior art devices fully utilize the energy stored within the magnets.

SUMMARY OF THE INVENTION

It would be highly advantageous, therefore, to remedy the foregoing and other deficiencies inherent in the prior art devices.

Accordingly, it is an object of the present invention to provide an improved magnetic motor.

Another object of the invention is the provision of a motor which is powered by the energy stored in permanent magnets.

And another object of the invention is to provide a magnetic motor having a rotor and a stator, each including permanent magnets.

Still another object of this invention is the provision of a magnetic motor wherein the energy of each pole of each magnet is utilized to urge rotation of the rotor.

Yet another object of the invention is to provide a magnet motor which operates on alternating phases of attraction and repulsion.

And still another object of the invention is the provision of a magnetic motor in which phase of attraction and repulsion occurs over an extended duration.

A further object of the instant invention is to provide a magnetic motor in which the shift is phases is accomplished with minimal input energy.

And a further object of the invention is the provision of a magnet motor in which the output characteristics of speed and power are controllably variable.

Yet a further object of the invention is to provide a magnetic motor having highly favorable ratio of input energy to output power.

And still a further object of the invention is the provision of a magnetic motor which is readily fabricated in various sizes and configurations in accordance with the immediate user's needs.

And yet a further object of the invention is to provide a magnetic motor of the above type which is comparatively simple and inexpensive to manufacture, yet is relatively durable and maintenance free.

Briefly, to achieve the desired objects of the instant invention in accordance with the preferred embodiment thereof, first provided is a rotor journalled within a frame. One or more permanent magnets, each having first and second poles of opposite polarity, are carried by the rotor. The magnets are arranged such that alternating first and second poles are spaced angularly relative the rotor. Magnetic means defining a stator alternates between a first phase of attracting the first pole of a given magnet and a second phase of repelling the second pole of the given magnet. Timing means detect the position of the magnet and signal the magnetic means for alternating between the first and second phases.

In accordance with one embodiment, the magnet means includes a pair of spaced apart permanent magnets each having the same pole directed toward the rotor. A solenoid, responsive to the timing means, selectively and alternately positions the stator magnets in close proximity to the rotor for alternately attracting or repelling the rotor magnets. The phases are accomplished by a single pole of a single permanent magnet the field of which is periodically nullified by electric means responsive to the timing means.

In a further embodiment, there is provided a second rotor spaced from the first rotor and rotatable therewith about a common axis. The second rotor includes a display of permanent magnets which are spaced corresponding to the spacing of the magnets on the first rotor, except oppositely oriented with respect to polarity. The second rotor is urged to rotate by the common stator in response to the opposite pole of the magnet thereof.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a semi-schematic illustration, generally in plan, of a magnetic motor embodying the principles of the instant invention;

FIG. 2 is a vertical sectional view taken along the line 2—2 of FIG. 1 and further illustrating the timing means thereof;

FIG. 3 is an elevation view, partly schematic, of an alternate embodiment of the instant invention directly related to the embodiment of FIG. 1;

FIG. 4 is a prospective view, partly broken away for purposes of illustration, of a further embodiment of a magnetic motor constructed in accordance with the teachings of the instant invention;

FIG. 5 is an elevation view, partly schematic and partly broken away, of the device of FIG. 4;

FIG. 6 is an enlarged view of that portion of the device of FIG. 5 within the broken out line area thereof designated by the character 6;

FIG. 7 is a semi-schematic representation of yet a further embodiment of the instant invention most closely related to the embodiment of FIG. 1; and FIG. 8 is a vertical sectional view taken along the line 8—8 of FIG. 6.

DESCRIPTION OF THE PREFERRED EMBODIMENT

Turning now to the drawings, in which like reference characters indicate corresponding elements throughout the several views, attention is first directed to FIG. 1 which illustrates a magnetic motor according to the instant invention having a rotor, a stator and a timing means generally designated by the reference characters 10, 11 and 12, respectively. Rotor 10 includes wheel 13, having outer peripheral edge 14 and carrying permanent magnets 15.

Each permanent magnet 15 is of the commercially available bar-type having poles of opposite polarity at respective ends. Perferably magnets 15 are curved to form a continuation of outer peripheral edge 14.

For purposes of simplicity of timing, magnets 15 are equiangularly spaced along peripheral edge 14. Each magnet 15 is oriented in the same direction. Accordingly, a pattern is established of angularly spaced alternating poles.

As will be readily recognized by those skilled in the art, the ends of a permanent bar-type magnet, such as illustrated herein, are commonly referred to as the north pole and the south pole. For purposes of clarity and ease of understanding, the letters "N" and "S", designating north pole and south pole, respectively, are shown on the illustration adjacent respective ends of the magnets. The pole designation is not intended to be limiting upon the instant invention since each pole so designated can be reversed without impairing the function of the invention.

Wheel 13 is carried by shaft 17 which is journaled for rotation in fragmentarily illustrated frame 18. Also carried by frame 18 is stator 11 which includes rocker 19 having first and second ends 20 and 22. Intermediate ends 20 and 22, rocker 19 is pivotally secured to frame 18 by pin 23. A first permanent magnet 24 is carried at first end 20 and a second permanent magnet 25 is carried at second end 22.

During the operation, rocker 19 oscillates as indicated by the double arrowed line 27. Spring 28 extending between rocker 19 and frame 18 normally urges the north pole end of first permanent magnet 24 into close proximity to the outer peripheral edge 14 of wheel 13. At this time the north pole of second permanent magnet 25 is in a position remote from outer peripheral edge 14. Electric solenoid 29 is of sufficient strength to overcome spring 28 and reposition the north pole of first magnet 24 remote from peripheral edge 14 and concurrently place the north pole of second magnet 25 near peripheral edge 14. It is noted that the distance between first magnet 24 and second magnet 25 generally corresponds to the length of magnet 15.

Solenoid 29 is energized in response to a signal from timing means 12. As further illustrated in FIG. 2, timing means 12 includes an electric eye device having a first unit 30 and a second unit 32 which respectively emit and receive a light beam. One of the units herein specifically illustrated as second unit 32, contains a normally open switch which is closed when the light beam is interrupted. Devices of the immediate type are commercially available and well known to those skilled in the art. Accordingly, further detailed description will not be made herein.

Periodically spaced shields 33 are carried by wheel 13. Shields 33, fabricated of metal, cardboard, or other opaque material, are positioned to pass between units 30 and 32 and interrupt the light beam thereby causing the switch within unit 32 to close. The length of each shield 32, measured along the peripheral edge 14 of wheel 13, generally corresponds to the length of magnet 15 also measured along peripheral edge 14.

One shield 33 corresponds to a given magnet 15. In the illustration of FIG. 1, shield 33 positioned between units 30 and 32 corresponds to magnet 15 adjacent stator 11. Units 30 and 32 may assume any position relative wheel 13 with shields 33 correspondingly shaped, sized and positioned. For simplicity of construction, it is suggested that units 30 and 32 be positioned on opposite sides of peripheral edge 13 and angularly spaced from stator 11 according to the angular spacing of the several magnets 15. Accordingly, shield 33 can be shaped to conform to the curve of peripheral edge 14, sized to correspond to the length of magnet 15 and positioned adjacent a magnet 15.

Battery 34, unit 32 of timing means 12 and solenoid 29 of stator 11 are connected in electrical series. Electric lead 47 communicates between terminal 37 of battery 34 and unit 32 of timing means 12. Electric lead 48 communicates between timing means 32 and solenoid 29. Communicating between solenoid 29 and battery 35 is electric lead 49. Accordingly, solenoid 29 is energized for the interval during which shield 33, considered part of the timing means 12, passes between units 30 and 32.

During rest or idle, the magnetic forces within the magnetic motor will attempt to achieve a state of equilibrium. Spring 29 urges the north pole of magnet 24 into close proximity to peripheral edge 14 of wheel 13. The closest south pole of any magnet 15 is attracted to the north pole of magnet 24. Accordingly, wheel 13 will stop at a point where the south pole of a magnet 15 and the north pole of magnet 24 are in equilibrium. At this point, shield 33 is in position to enter up the light beam between units 30 and 32.

Operation of the magnetic motor is initiated by closing the electrical circuit of battery 34, unit 32 and solenoid 29. For this purpose, switch 50 is entered into the circuit. Immediately solenoid 29 is energized extending spring 28, oscillating rocker 19 to a position wherein the north pole of magnet 24 is remote from peripheral edge 14 and the north pole of magnet 25 is in close proximity to peripheral edge 14. In the position, the center of the force field of the north pole of magnet 25 is slightly behind the center of the force field of the north pole of magnet 15 as oriented relative the direction of rotation of rotor 10 as indicated by the arrowed line 52. In response thereto, magnet 15 is repelled from magnet 25 urging rotation of rotor 10 in the direction indicated by arrowed line 52. Concurrent therewith, the north pole of magnet 25 attracts the south pole of the adjacent magnet 15 further urging rotation of rotor 10. As the center of the force field of the first magnet 15 passes the center of the force field of the north pole of the magnet 24, where magnet 24 is in the rest position, shield 33 emerges from between unit 30 and 32. The light beam as established, the switch within unit 32 opened and solenoid 29 relaxed. Spring 28 now assumes control of rocker 19 repositioning magnets 24 and 25 to the rest position. Magnet 24 now assumes the function immediately previously attributed to magnet 25.

The repelling force between the first magnet 15 and magnet 24 and the attracting force between the adjacent magnet 15 and magnet 24 continues until the south pole of the adjacent magnet 15 and the north pole of magnet 24 are at the approximate point of equilibrium. At this time a subsequent shield 33 disrupts the beam between units 30 and 32, again energizing solenoid 29 and oscillating rocker 19 and again positioning magnet 24 remote from peripheral edge 14 and magnet 25 in close proximity to peripheral edge 14 for continuing powered rotation of rotor 10 as previously described.

From the foregoing description it is apparent that the magnetic motor is powered by alternating first and second phases. During the first phase the south pole of a magnet 15 is attracted to the north pole of magnet 24, and during the second phase the north pole of a magnet 15 is repelled from the north pole of magnet 24. In relation to a given magnet, the first and second phases are separated by a short interval during which rocker 19 is oscillated. In relation to adjacent magnets, the phases tend to overlap. It is recognized that the strength of the magnetic force weakens in proportion to the square of the distance between the magnets. Nevertheless, the spacing between adjacent magnets 15 may be such that at an intermediate point the north pole of magnet 24 may concurrently influence the north pole of a given magnet 15 and the south pole of an adjacent magnet 15. Hence, rotor 10 is continuously receiving a power pulse except for the exceedingly brief interval during which rocker 19 oscillates from one position to the other.

FIG. 7 illustrates an alternate embodiment of the instant invention having a rotor 10, timing means 12, battery 34 and other components in common with the embodiment described in detail in connection with FIGS. 1 and 2. The primary difference resides in an alternate stator generally designated by the reference character 53. Stator 53 includes a rigidly affixed bar-type permanent magnet 54 having the north pole thereof in close proximity to peripheral edge 14 of wheel 13. Coil 55 encircles magnet 54. As will be readily recognized by those skilled in the art, the force fields of both the north and south poles of a permanent magnet can be nullified by passing electrical current through a coil encasing the magnet.

Operation of the embodiment of FIG. 7 is generally analogous to the operation of the embodiment of FIG. 1. During rest, equilibrium is established as previously described between the south pole of a permanent magnet 15 and the north pole of magnet 54. In contrast, however, the device is not self starting and requires external power to initiate rotation of rotor 10 in the direction of arrowed line 52.

Coil 55, in similarity to solenoid 29, is energized only during the period that a magnet 15 is adjacent magnet 54. More specifically, coil 55 is energized during the interval approximately defined as between the point of equilibrium of the south pole of a magnet 15 and the north pole of magnet 54 and the north pole of the same magnet 15 and the north pole of magnet 54. During the first phase, which is also considered the first power stroke, the north pole of the first magnet 15 is repelled from the north pole of magnet 54. During the second phase, which may be considered the second power stroke, the south pole of an adjacent magnet 15 is attracted to the north pole of magnet 54. As previously described, coil 55 is generated during intervals determined by timing means 12 and in response to a signal therefrom.

The foregoing descriptions of the embodiments of FIGS. 1 and 7 serve to illustrate the general principles of the instant invention. These embodiments are not considered optimum, however, since the total energy available in the respective stator magnets are not utilized to produce useful output power or work. It is noted that each stator magnet has an unused south pole. The embodiments of FIGS. 3 and 4 fully utilize the stator magnet to double the power output without increase in the input energy.

Referring now to FIG. 3, there is seen a dual rotor embodiment of the magnetic motor of FIG. 1. The second rotor is the same as the previously described rotor 10. For purposes of clarity, a second rotor is designated by the reference character 10a and the components thereof corresponding to the components of rotor 10 are designated by like reference characters having the suffix "a".

Second rotor 10a is fixed to shaft 17 in spaced relationship to first rotor 10. Permanent magnets 15 and 15a are positionally aligned but with reversed polarity. Stator 11 is positioned between rotors 10 and 10a. The spacing between first rotor 10 and second rotor 10a corresponds to the limits of movement of magnets 24 and 25 during oscillation of rocker 19 as indicated by the double arrowed line 27. That is, during the extremes of movement one of the magnets is in close proximity to one of the rotors while the other magnet is in close proximity to the other of the rotors.

The position illustrated is taken at a time just prior to solenoid 29 being energized. The north pole of magnet 24 is attracting the south pole of magnet 15 and concurrently the south pole of magnet 25 is repelling the south pole of magnet 15a. During oscillation of rocker 19, during which period solenoid 29 is energized, rotors 10 and 10a will continue to move in the direction indicated by arrows 52 and 52a to what may be termed, for purposes of reference, a later position. At the later position the south pole of magnet 24 is brought into close proximity to rotor 10a and the north pole of magnet 25 is brought into close proximity to rotor 10. The center of the field of force of the south pole of magnet 15a has passed the center of the field of force of the south pole of magnet 24. Accordingly, the south pole of magnet 15a is repelled by the south pole of magnet 24 and the north pole of magnet 15 is repelled by the north pole of magnet 25. Concurrently, the north pole of magnet 25 attracts the south pole of an adjacent magnet 15 and the south pole of magnet 24 attracts the north pole of an adjacent magnet 15a. After the foregoing interval in which magnets 15 and 15a pass stator 11, electric current to solenoid 29 is discontinued and spring 28 returns rocker 19 to the position illustrated. The north pole of magnet 24 assumes the function of the north pole of magnet 25 and the south pole of magnet 25 assumes the function of the south pole of magnet 24 continuing the attracting and repelling magnetic forces until magnets 15 and 15a reach stator 11 and solenoid 29 is again energized.

The embodiment of FIG. 4 while having dual rotors as described in connection with the embodiment of FIG. 3, utilizes a stator of the type described in connection with the device of FIG. 7. First and second rotors 59 and 60, respectively, are affixed in spaced apart relationship to shaft 62 which is journaled for rotation in frame 63. Rotor 59 includes wheel 64 having outer peripheral edge 65. A plurality of angularly spaced permanent magnets 67, each having a north pole and a south pole, are carried by wheel 64. Second rotor 60 is a mere image of first rotor 59 having corresponding components which are designated by corresponding reference characters including the suffix "a".

Magnets 67 and 67a are curved to conform to the peripheral edges 67 and 67a of wheels 64 and 64a. Each magnet 67 has a corresponding magnet 67a which is positionally aligned therewith. The respective poles of magnets 67 and 67a, however, are oppositely aligned. That is, the north pole of a magnet 67 is opposite the south pole of the corresponding magnet 67a while the south pole of the magnet 67 is opposite the north pole of the magnet 67a.

As better seen in FIGS. 5 and 6, magnets 67 and 67a have channels 68 and 68a, respectively, formed therein. Channels 68 and 68a are arcuate having a radius of curvature with the center at the axis of rotation of shaft 62. Channels 68 and 68a are opposite and aligned to receive first and second ends 69 and 70, respectively, of stator magnet 72. Stator magnet 72 is of the general type previously described in connection with FIG. 7 having a south pole at first end 69 and a north pole at second end 70. Coil 73, the equivalent of previously described coil 55, extends about an intermediate portion of magnet 72.

Functionally, the immediate embodiment is analogous to a combination of the operations previously described in connection with FIGS. 3 and 7. With coil 73 in the un-energized position, the south pole of magnet 72 attracts the north pole of a magnet 67 while the north pole of magnet 72 attracts the south pole of a corresponding magnet 67a. The attraction continues, urging synchronous rotation of rotors 59 and 60, to approximately the point where an equilibrium is reached between the two pair of attracting magnetic poles. At that point, in response to a signal from the timing means as herein previously described, coil 73 is energized. When energized, coil 73 nullifies the force of the north and south poles of magnet 72. Coil 73 remains energized until the south pole of magnet 67 and the north pole of magnet 67a has moved to a new point immediately beyond equilibrium with the respective poles of magnet 72. At this point in response to signal from the timing means, the flow of electrical current to coil 73 is terminated. Accordingly, the south pole of the magnet 67 is repelled from the south pole of magnet 72, while the north pole of the corresponding magnet 67a is repelled from the north pole of magnet 72. The repulsion continues urging rotation of rotors 59 and 60 and brings rotors 59 and 60 into position where the south pole of magnet 72 attracts the north pole of an adjacent magnet 67 and the north pole of magnet 72 attracts the south pole of an adjacent magnet 67a.

It is noted that the south pole and north pole of magnet 72 reside within respective channels 68 and 68a. The close proximity of the north and south poles of magnet 72 to the side walls of the respective channels 68a and 68 increases the force of the magnetic field. The immediate embodiment rotates in the direction of arrowed line 52. First end 69 of magnet 72, as seen in FIG. 8, is angled to face against the direction of rotation. Although not specifically shown, second end 70 is similarly angled imparting a generally U-shape to magnet 72. The angled ends 69 and 70 align the polarity for maximum attraction and repulsion with the respective magnets 67 and 67a.

As will be appreciated by those skilled in the art, the deeper ends 69 and 70 reside within the respective channels 68 and 68a, the greater the power and speed output of the device. Conversely, as ends 69 and 70 emerge from the respective channels 68 and 68a, the speed and power output of the device is diminished. To provide for adjustably controlled speed and power output, shaft 62 is divided into a first shaft element 74 and a second shaft element 75, as best seen in FIGS. 5 and 6. Shafts 74 and 75 have threaded portions 77 and 78, respectively, of opposite hand threads. Adjusting nut 79 has a bore 80 therethrough which is threaded with opposite hand threads extending inwardly from either end. Accordingly, rotation of adjusting nut 79 in one direction increases the spacing between rotors 59 and 60, while rotation in the other direction decreases the distance between rotors 59 and 60.

A test model of a magnetic motor embodying the principles of the instant invention has been constructed. The device included rotors, analogous to those illustrated in FIG. 3, and a stator generally of the type seen in FIG. 7. The rotors were identical, each having a diameter of 14 inches and carrying eight magnets. Each rotor magnet was approximately 3.125 inches long occupying approximately 29.5% of the total circumference of the rotor. The stator magnet was positioned, generally as shown in FIG. 7, i.e. adjacent the outer peripheral edge of the rotors.

A primary purpose of the test model was to observe the work capability of a device constructed in accordance with the teachings of the instant invention. Specifically, the work took the form of lifting a weight of known measurement, a height of 5 feet. The weight was measured on a laboratory scale and observed to be 294.3 grams or 0.6487 pounds. The weight was lifted on several occasions, having an average time of 16 seconds. Using the foregoing data it can be calculated that the device produced 3.2435 foot pounds of work which converts to an output of 0.2749 watts. It is interesting to note that the average speed of the device during the test was 47.87 revolutions per minute.

The device was constructed entirely of materials at hand or readily available. Accordingly, a tremendously over-sized coil requiring inordinate power input was used. The current necessary to operate the coil was one amp at 12.4 volts DC. Considering that the rotor magnets occupy 29.5% of the total circumference of the wheels and that the stator magnet need be energized only for a total dwell time of 29.5%, the power consumption is calculated at 3.5 watts. Accordingly, in the test model the electrical power input exceeded the work output by a factor of 12.73.

According to the prior art, "Experimentally it has been determined that the losses do not increase as rapidly as the output, . . . " (U.S. Pat. No. 3,895,245, Column 4, lines 18 and 19). As previously stated, the test model was fabricated from readily available material which included rotor magnets of relatively weak field strength and a coil requiring substantial electrical current. It is believed, therefore, that magnets of substantially greater field strength can be used with the current stator magnet and coil without increasing input energy requirements to provide a more favorable work output ratio.

Various changes and modifications to the devices herein chosen for purposes of illustration will readily occur to those skilled in the art. To the extent that such modifications and variations do not depart from the spirit of the invention, they are intended to be included within the scope thereof which is limited only by a fair interpretation of the claims.

Having fully described and disclosed the present invention and alternately preferred embodiments thereof in such clear and concise terms as to enable those skilled in the art to understand and practice the same, the invention claimed is:

1. A magnetic motor for utilizing the energy stored in a permanent magnet to produce rotational force, said motor comprising:
   a. a frame;
   b. a rotor rotatably carried by said frame;
   c. a permanent magnet carried by said rotor and having first and second poles of opposite polarity,
      said first and second poles being spaced angularly relative said rotor;
   d. magnetic stator means alternating between,
      i. a first phase attracting the first pole of said permanent magnet, and
      ii. a second phase repelling the second pole of said permanent magnet; and
   e. timing means for detecting the position of said permanent magnet and for signalling said stator means for alternating between said first phase and said second phase for urging rotation of said rotor.

2. The magnetic motor of claim 1, wherein said timing means includes:

a. a normally open switch; and b. a closure element carried by said rotor for periodically closing said switch for a predetermined interval.

3. The magnetic motor of claim 1, wherein said stator means includes:

a. a second permanent magnet having a first pole and a second pole and movable between,
  i. a first position in which said second pole is in close proximity to said rotor for effecting said first phase, and
  ii. a second position in which said second pole is spaced from said rotor for nullifying said first phase; and b. a third permanent magnet having a first pole and a second pole and movable between,
  i. a first position in which said first pole is in close proximity to said rotor for effecting said second phase, and
  ii. a second position in which said first pole is spaced from said rotor for nullifying said second phase.

4. The magnetic motor of claim 3, wherein said stator means further includes:

a. a rocker having,
  i. a first end carrying said second permanent magnet, and
  ii. a second end carrying said third permanent magnet;

b. biasing means normally urging the second end of said rocker to a position remote from said rotor to effect said first phase; and c. a solenoid responsive to said timing means for urging the first end of said rocker to a position remote from said rotor to effect said second phase.

5. The magnetic motor of claim 4, further including:

a. a second rotor spaced from first said rotor and rotatable therewith about a common axis; and b. another permanent magnet similar to first said permanent magnet and carried by said second rotor and having first and second poles of opposite polarity, said first and said second poles being spaced angularly relative said second rotor, the first and second poles of said another permanent magnet being aligned with the second and first poles, respectively, of first said permanent magnet;

the first pole of said second permanent magnet being in close proximity to said second rotor when said second permanent magnet is in said second position, and the second pole of said third permanent magnet being in close proximity to said second rotor when said third permanent magnet is in said second position, whereby said second rotor is urged to rotate in synchronization with first said rotor.

6. The magnetic motor of claim 1, wherein:

a. said stator means includes,
  i. a second permanent magnet having a second pole at one end thereof in close proximity to said rotor, and
  ii. electric means for nullifying the second pole of said second permanent magnet; and b. said timing means includes,
  i. a source of electrical energy for energizing said electric means,
  ii. a normally open switch in series between said source of electrical energy and said electric means, and
  iii. means for closing said switch during an interval of determinate duration,
  said first phase occurring prior to said interval, and
  said second phase occurring subsequent to said interval.

7. The magnetic motor of claim 6, wherein the duration of said interval is proportional to the speed of said rotor and is generally the time during which first said permanent magnet moves across said second permanent magnet and measured between,
  i. an initial point in which said first phase is at maximum attraction, and
  ii. a terminal point in which said second phase is at maximum repulsion.

8. The magnetic motor of claim 6, wherein said first permanent magnet includes an arcuate channel having a radius of curvature with center coincident with the axis of rotation of said rotor, said channel sized to receive said one end of said second permanent magnet therein during said interval.

9. The magnetic motor of claim 8, further including adjustment means for selectively controlling the depth to which said one end of said second permanent magnet is received within said channel.

10. The magnetic motor of either claim 6 or claim 8, further including a plurality of permanent magnets carried by said rotor in angularly spaced apart relationships, each of said plurality of permanent magnets being similar to first said permanent magnet and wherein said timing means periodically energizes said stator means for sequentially attracting and repelling the first and second poles, respectively, of successive ones of said plurality of permanent magnets.

11. The magnetic motor of claim 6, further including:

a. a second rotor spaced from first said rotor and rotatable therewith about a common axis;

b. another permanent magnet similar to first said permanent magnet and carried by said second rotor and having first and second poles of opposite polarity, said first and said second poles being spaced angularly relative said second rotor, the first and second poles of said another permanent magnet being aligned with the second and first poles, respectively, of first said permanent magnet;

c. another end of second permanent magnet having a first pole of opposite polarity to the second pole at said one end; and d. said electric means further nullifying the first pole of said second permanent magnet concurrent with nullifying the second pole of said second permanent magnet, whereby said second rotor is caused to rotate in synchronization with first said rotor.

* * * * *